(12) United States Patent
Schmidt et al.

(10) Patent No.: US 11,014,334 B2
(45) Date of Patent: *May 25, 2021

(54) METHOD FOR FORMING A LAMINATE COMPRISING A TWO-COMPONENT SOLVENTLESS ADHESIVE COMPOSITION INCLUDING AN AMINE-INITIATED POLYL

(71) Applicants: Dow Global Technologies LLC, Midland, MI (US); Rohm and Haas Company, Philadelphia, PA (US)

(72) Inventors: Thorsten Schmidt, Horgen (CH); Daniele Vinci, Horgen (CH); Marco Frasconi, Mozzate (IT)

(73) Assignees: Dow Global Technologies LLC, Midland, MI (US); Rohm and Haas Company, Collegeville, PA (US)

( * ) Notice: Subject to any disclaimer, the term of this patent is extended or adjusted under 35 U.S.C. 154(b) by 18 days.

This patent is subject to a terminal disclaimer.

(21) Appl. No.: 16/300,561

(22) PCT Filed: Apr. 25, 2017

(86) PCT No.: PCT/US2017/029287
§ 371 (c)(1),
(2) Date: Nov. 10, 2018

(87) PCT Pub. No.: WO2017/196528
PCT Pub. Date: Nov. 16, 2017

(65) Prior Publication Data
US 2019/0202172 A1     Jul. 4, 2019

(30) Foreign Application Priority Data

May 10, 2016 (IT) .......................... 102016000047944
Mar. 20, 2017 (CN) .......................... 201710165096.0

(51) Int. Cl.
| | | |
|---|---|---|
| C09J 5/04 | (2006.01) | |
| C09J 175/12 | (2006.01) | |
| B32B 27/40 | (2006.01) | |
| B32B 7/12 | (2006.01) | |
| C08G 18/10 | (2006.01) | |
| B32B 27/08 | (2006.01) | |
| B32B 27/10 | (2006.01) | |
| B32B 27/12 | (2006.01) | |

(Continued)

(52) U.S. Cl.
CPC ............... *B32B 7/12* (2013.01); *B32B 5/022* (2013.01); *B32B 5/024* (2013.01); *B32B 5/26* (2013.01); *B32B 15/08* (2013.01); *B32B 15/12* (2013.01); *B32B 15/14* (2013.01); *B32B 27/06* (2013.01); *B32B 27/08* (2013.01); *B32B 27/10* (2013.01); *B32B 27/12* (2013.01); *B32B 29/002* (2013.01); *B32B 29/005* (2013.01); *B32B 29/02* (2013.01); *B32B 37/0053* (2013.01); *C08G 18/10* (2013.01); *C08G 18/3275* (2013.01); *C08G 18/4018* (2013.01); *C08G 18/5021* (2013.01); *C08G 18/76* (2013.01); *C08G 18/7614* (2013.01); *C09J 5/04* (2013.01); *C09J 175/04* (2013.01); *C09J 175/08* (2013.01); *C09J 175/12* (2013.01); *B32B 2037/1269* (2013.01); *B32B 2250/02* (2013.01); *B32B 2250/20* (2013.01); *B32B 2250/24* (2013.01); *B32B 2250/26* (2013.01); *B32B 2255/10* (2013.01); *B32B 2255/205* (2013.01); *B32B 2305/72* (2013.01); *B32B 2307/4023* (2013.01); *B32B 2307/50* (2013.01); *B32B 2307/718* (2013.01); *B32B 2307/75* (2013.01); *B32B 2439/70* (2013.01); *C08G 18/222* (2013.01); *C08G 18/227* (2013.01); *C08G 18/24* (2013.01); *C09J 2475/00* (2013.01)

(58) Field of Classification Search
None
See application file for complete search history.

(56) References Cited

U.S. PATENT DOCUMENTS 3,840,419 A * 10/1974 De Keyser .............. B32B 27/00
156/307.3
4,184,005 A    1/1980 Bauriedel et al.
(Continued)

FOREIGN PATENT DOCUMENTS

| WO | 2000071343 A1 | 11/2000 |
|---|---|---|
| WO | 2015057444 A1 | 4/2015 |
| WO | 2016/025234 A1 | 2/2016 |

OTHER PUBLICATIONS

IUPAC Gold Book entry for "alkyl groups"; doi:10.1351/goldbook. A00228. (Year: 2014).*

(Continued)

*Primary Examiner* — Michael J Feely

(57) ABSTRACT

Methods for forming a laminate structure comprising a two-component solventless polyurethane adhesive compositions are disclosed. The adhesive composition is formulated such that each component is applied independently to corresponding substrates prior to the substrates being brought together to form the laminate structure. The adhesive compositions are highly-reactive and can comprise amine-initiated polyols or catalysts providing for fast curing. The amine-initiated polyols comprise a functionality of from 2 to 12, a hydroxyl number of from 5 to 1,830, and a viscosity at 40 C of from 500 to 20,000 mPa-s. The catalyst can be bismuth catalysts, zinc catalysts, zirconium catalysts, tin catalysts, and aluminum catalysts. Still further, a laminate formed according to the methods is disclosed.

14 Claims, 2 Drawing Sheets

(51) Int. Cl.

| | |
|---|---|
| *C09J 175/04* | (2006.01) |
| *C09J 175/08* | (2006.01) |
| *C08G 18/50* | (2006.01) |
| *C08G 18/76* | (2006.01) |
| *B32B 27/06* | (2006.01) |
| *B32B 5/02* | (2006.01) |
| *B32B 15/12* | (2006.01) |
| *B32B 29/00* | (2006.01) |
| *B32B 29/02* | (2006.01) |
| *B32B 15/08* | (2006.01) |
| *B32B 15/14* | (2006.01) |
| *B32B 5/26* | (2006.01) |
| *C08G 18/40* | (2006.01) |
| *B32B 37/00* | (2006.01) |
| *C08G 18/32* | (2006.01) |
| *C08G 18/38* | (2006.01) |
| *B32B 37/12* | (2006.01) |
| *C08G 18/22* | (2006.01) |
| *C08G 18/24* | (2006.01) |

(56) References Cited

U.S. PATENT DOCUMENTS

| | | | |
|---|---|---|---|
| 4,342,613 A | | 8/1982 | O'Leary et al. |
| 5,614,575 A | * | 3/1997 | Kotschwar ........... C08G 18/482 |
| | | | 524/270 |
| 2010/0297427 A1 | | 11/2010 | Schlingloff et al. |
| 2019/0177575 A1 | * | 6/2019 | Wu ........................ B32B 5/024 |
| 2019/0390094 A1 | * | 12/2019 | Wu ........................ C08G 18/10 |
| 2019/0390095 A1 | * | 12/2019 | Vinci ................. C08G 18/3278 |

OTHER PUBLICATIONS

IUPAC Gold Book entry for "alkyl radicals"; doi:10.1351/goldbook. A00235. (Year: 2014).*

IUPAC Gold Book entry for "alkylenes"; doi:10.1351/goldbook. A00227. (Year: 2014).*

PCT/US2017/029287, International Search Report and Written Opinion dated Jul. 3, 2017.

PCT/US2017/029287, International Preliminary Report on Patentability dated Nov. 13, 2019.

* cited by examiner

METHOD FOR FORMING A LAMINATE COMPRISING A TWO-COMPONENT SOLVENTLESS ADHESIVE COMPOSITION INCLUDING AN AMINE-INITIATED POLYL

REFERENCE TO RELATED APPLICATIONS

The present application claims the benefit of Italy Application No. 102016000047944, filed on May 10, 2016 and Chinese Application No. 201710165096.0, filed on Mar. 20, 2017.

FIELD OF THE DISCLOSURE

The instant disclosure relates to methods for forming a laminate structure comprising solventless adhesive compositions. More particularly, the disclosure relates to methods for forming a laminate comprising a two-component solventless polyurethane adhesive composition formulated such that each component is configured to be applied independently to corresponding substrates prior to the substrates being brought together to form the laminate structure. The adhesive compositions can comprise amine-initiated polyols providing for fast curing speeds and improved conversion efficiency. In some embodiments, the adhesive compositions can comprise catalysts for increasing the reactivity of the adhesive composition, such as bismuth catalysts, zinc catalysts, zirconium catalysts, tin catalysts, and aluminum catalysts.

In some embodiments, one component of the adhesive composition is configured to be uniformly applied to a surface of a first substrate and the other component of the adhesive composition is configured to be applied to a surface of a second substrate. The first and second substrates are subsequently brought together, thereby mixing and reacting the two components to form an adhesive between the first and second substrates. In this way, the adhesive can then be cured, thereby bonding the first and second substrates.

BACKGROUND OF THE DISCLOSURE

Adhesive compositions are useful for a wide variety of purposes. For instance, adhesive compositions are used to bond together substrates such as polyethylene, polypropylene, polyester, polyamide, metal, paper, or cellophane to form composite films, i.e., laminates. The use of adhesives in different end-use applications is generally known. For example, adhesives can be used in the manufacture of film/film and film/foil laminates used in the packaging industry, especially for food packaging. Adhesives used in laminating applications, or "laminating adhesives," can be generally placed into three categories: solvent-based, water-based, and solventless. The performance of an adhesive varies by category and by the application in which the adhesive is applied.

Solventless laminating adhesives can be applied up to one hundred percent solids without either organic solvent or an aqueous carrier. Because no organic solvent or water has to be dried from the adhesive upon application, these adhesives can be run at high line speeds and are preferable in applications requiring quick adhesive application. Solvent and water-based laminating adhesives are limited by the rate at which the solvent or water can be effectively dried and removed from the laminate structure after application of the adhesive. For environmental, health, and safety reasons, laminating adhesives are preferably aqueous or solventless.

Within the category of solventless laminating adhesives, there are many varieties. One particular variety includes premixed two-component polyurethane-based laminating adhesives. Typically, a two-component polyurethane-based laminating adhesive includes a first component comprising an isocyanate-containing prepolymer and/or a polyisocyanate and a second component comprising a polyol. The prepolymer can be obtained by the reaction of excess isocyanate with a polyether and/or polyester containing two or more hydroxyl groups per molecule. The second component comprises a polyether and/or polyester functionalized with two or more hydroxyl groups per molecule. The two components are combined in a predetermined ratio, or "premixed," and then applied on a first substrate ("carrier web"). The first substrate is then brought together with a second substrate to form a laminate structure. The first and second substrates must be brought together within the pot-life of the adhesive composition, usually less than thirty minutes.

Additional layers of substrate can be added to the structure with additional layers of adhesive composition located between each successive substrate. The adhesive is then cured, either at room temperature or elevated temperature, thereby bonding the substrates together.

Further processing of the laminate structure depends upon the curing speed of the adhesive. The curing speed of the adhesive is indicated by the time in which the mechanical bond between the laminated substrates takes to become sufficient to allow for further processing and the laminate is in compliance with applicable regulations (e.g., food contact regulations). Slow curing speed results in lower conversion efficiency. Premixed two-component solventless laminating adhesives, compared to traditional solvent-containing adhesives, exhibit weak initial bonds and slow curing speed. The general trend in the converting industry is towards faster curing laminating adhesives. Faster curing improves the operational efficiency for converters. Specifically, quickly moving finished products out of a warehouse increases production capacity and flexibility for handling last minute orders (e.g., retailer promotional campaigns). In order to increase operational efficiency, an adhesive composition with a reactivity much higher than existing adhesive compositions should be used to form laminates. However, such an adhesive composition would provide a challenge for traditional adhesive application technologies.

Accordingly, faster and more efficient methods for forming a laminate comprising two-component solventless polyurethane-based laminating adhesive compositions are desirable.

SUMMARY OF THE DISCLOSURE

Methods for forming a laminate structure are disclosed. In some embodiments, the method includes uniformly applying an isocyanate component to a first substrate. The isocyanate component includes at least one polyisocyanate. The method further includes uniformly applying a polyol component to a second substrate. The first and second substrates are then brought together, thereby mixing and reacting the isocyanate component and the polyol component to form an adhesive between the first and second substrates. The mixed adhesive composition is then cured, thereby bonding the first and second substrates. Because of the reactivity of the constituents of the adhesive composition, the adhesive composition is capable of achieving a viscosity greater than 10,000 mPa-s within 10 minutes after bringing the first and second substrates together.

Laminated structures made according to the disclosed methods can be slit within as little as two hours after lamination and delivered within two days to a customer. Laminates made using existing general purpose adhesive compositions typically require two to three days from lamination for slitting and five to seven days for delivery. Accordingly, the process efficiencies are greatly improved according to the disclosed methods. In addition, the pot-life of the adhesive compositions used in the disclosed methods is indefinite compared to a twenty to thirty minute pot-life for existing general purpose adhesives. This is because the pot-life of the disclosed adhesive compositions is completely decoupled from the curing process, as will be discussed below.

Because the adhesive compositions used in the disclosed methods are formulated to be more highly reactive than existing adhesive compositions, they are not ideally suited for use with existing adhesive application apparatuses. This is because the two components react very quickly, causing the adhesive to gel and be unfit for application to a substrate. For this reason, the adhesive compositions used in the disclosed methods are formulated such that the isocyanate and polyol components are applied separately on two different substrates, instead of being premixed and applied on a carrier web.

In particular, the adhesive compositions used in the disclosed methods are formulated such the isocyanate component can be uniformly applied to a surface of a first substrate and the polyol component can be uniformly applied to a surface of a second substrate. The surface of the first substrate is then brought into contact with the surface of the second substrate to mix and react the two components, thereby forming a laminate. The adhesive composition is then cured.

BRIEF DESCRIPTION OF THE DRAWINGS

Reference is made to the accompanying drawings in which.

DETAILED DESCRIPTION OF THE DISCLOSURE

Figure 1:
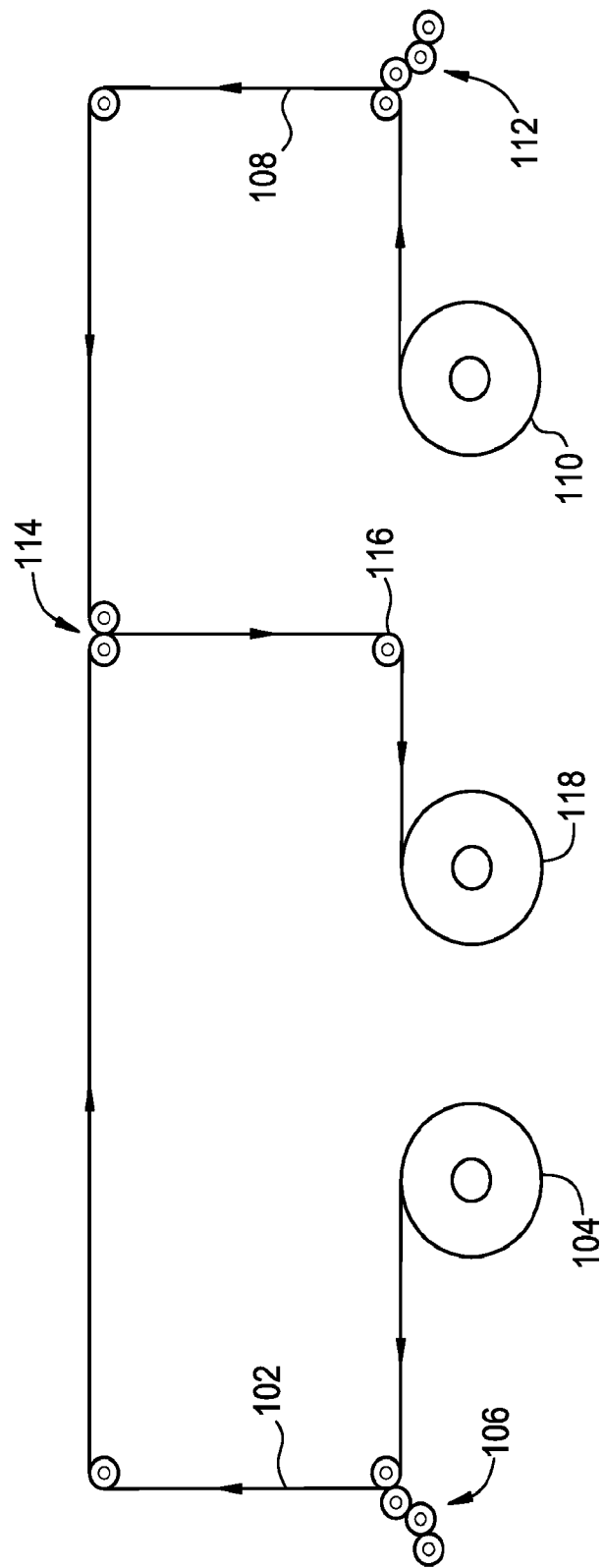
FIG. 1 is a schematic illustration of an application apparatus for forming a laminate comprising an adhesive composition.

The two-component solventless adhesive compositions used in the disclosed methods comprises an isocyanate component and a polyol component, as stated above.

Isocyanate Component

The isocyanate component comprises at least one isocyanate. The at least one isocyanate can be selected from the group consisting of an isocyanate prepolymer, an isocyanate monomer, a polyisocyanate (e.g., dimers, trimmers, etc.), and combinations of two or more thereof. As used herein, a "polyisocyanate" is any compound that contains two or more isocyanate groups. The isocyanate prepolymer is the reaction product of reactants comprising at least one isocyanate and at least one polyol. As used herein, the "isocyanate prepolymer" can be a polyisocyanate itself.

The at least one isocyanate comprises a functionality of from 1.5 to 10, or from 1.8 to 5, or from 2 to 3. As used with respect to the isocyanate component, "functionality" refers to the number of hydroxyl reactive sites per molecule. Compounds having isocyanate groups, such as the isocyanate component, may be characterized by the parameter "% NCO," which is the amount of isocyanate groups by weight based on the weight of the compound. The parameter % NCO is measured by the method of ASTM D 2572-97 (2010). The disclosed isocyanate component has a % NCO of at least 3%, or at least 6%, or at least 10%. Preferably the isocyanate component has a % NCO not to exceed 25%, or 18%, or 14%.

Further, the at least one isocyanate comprises a free monomer content of from 0 to 50%, or from 5 to 40%, or from 10 to 30%. Still further, the at least one isocyanate comprises a molecular weight of from 200 to 3,000 g/mol, or from 300 to 2,000 g/mol, or from 500 to 1,000 g/mol. Even further, the isocyanate component has viscosity at 25° C. of from 300 to 40,000 mPa-s, or from 500 to 20,000 mPa-s, or from 1,000 to 10,000 mPa-s, as measured by the method of ASTM D2196.

The at least one isocyanate of the isocyanate component can be selected from the group consisting of an aromatic isocyanate, an aliphatic isocyanate, a cycloaliphatic isocyanate, and combinations thereof. An "aromatic polyisocyanate" is an isocyanate that contains one or more aromatic rings. An "aliphatic polyisocyanate" contains no aromatic rings. A "cycloaliphatic polyisocyanate" is a subset of aliphatic polyisocyanates, wherein the chemical chain is ring-structured.

Examples of aromatic isocyanates suitable for use according to the disclosure include, but are not limited to, isomers of methylene diphenyl diisocyanate ("MDI"), such as 4,4-MDI, 2,2-MDI and 2,4-MDI, isomers of toluene-diisocyanate ("TDI") such as 2,4-TDI, 2,6-TDI, isomers of naphthalene-diisocyanate ("NDI") such as 1,5-NDI, isomers of norbornane diisocyanate ("NBDI"), isomers of tetramethylxylylene diisocyanate ("TMXDI"), and combinations of two or more thereof. Preferred are isomers of MDI, particularly a mixture of 4,4-MDI and 2,4-MDI (i.e., liquid MDI) or 4,4-MDI (i.e., solid MDI).

Examples of aliphatic and cycloaliphatic isocyanates suitable for use according to the disclosure include, but are not limited to, isomers of hexamethylene diisocyanate ("HDI"), isomers of isophorone diisocyanate ("IPDI"), isomers of xylene diisocyanate ("XDI"), and combinations thereof.

The amount of the at least one isocyanate in the adhesive composition is, by weight based on the weight of the adhesive composition (i.e., the total weight of the isocyanate component and the polyol component), at least 5 wt %, or at least 10 wt %, or at least 20 wt %. The amount of the at least one isocyanate in the adhesive composition is, by weight based on the weight of the adhesive composition, not to exceed 100 wt %, or not to exceed 95 wt %, or not to exceed 90 wt %.

The isocyanate component can further comprise other constituents commonly known to those of ordinary skill in the art, e.g., polyols, catalysts, etc.

Polyol Component

In some embodiments, the solventless adhesive composition further comprises a polyol component comprising at least one highly-reactive amine-initiated polyol. Inclusion of the at least one amine-initiated polyol in the polyol component provides for higher reactivity and faster curing than traditional polyols used in existing two component solventless adhesive compositions. The amine-initiated polyol comprises primary hydroxyl groups and a backbone incorporating at least one tertiary amine. In some embodiments, the polyol component can also comprise another type of polyol which is a non-amine-initiated polyol. Each polyol type may include one kind of polyol. Alternatively, each polyol type may include mixtures of different kinds of polyols. In some embodiments, one polyol type may be one kind of polyol whereas the other polyol type may be a mixture of different kinds of polyols.

The amine-initiated polyol comprises primary hydroxyl groups and a backbone incorporating at least one tertiary amine. In some embodiments, the amine-initiated polyol has the chemical structure of I:

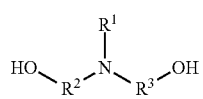

I wherein $R^1$, $R^2$, and $R^3$ are each independently a linear or branched alkyl group. For instance, can each independently be a $C_1$-$C_6$ linear or branched alkyl group. In some embodiments, the amine-initiated polyol comprises tertiary amines and secondary amines.

The at least one amine-initiated polyol comprises a functionality of from 2 to 12, or from 3 to 10, or from 4 to 8. As used with respect to the polyol component, "functionality" refers to the number of isocyanate reactive sites per molecule. Further, the at least one amine-initiated polyol comprises a hydroxyl number of from 5 to 1,830, or from 20 to 100, or from 31 to 40. As used with respect to the polyol component, "hydroxyl number" is a measure of the amount of reactive hydroxyl groups available for reaction. This number is determined in a wet analytical method and is reported as the number of milligrams of potassium hydroxide equivalent to the hydroxyl groups found in one gram of the sample. The most commonly used methods to determine hydroxyl number are described in ASTM D 4274 D. Still further, the at least one amine-initiated polyol comprises a viscosity at 25° C. of from 500 to 20,000 mPa-s, or from 1,000 to 15,000 mPa-s, or from 1,500 to 10,000 mPa-s.

Amine-initiated polyols suitable for use according to this disclosure are made by alkoxylating one or more amine initiators with one or more alkylene oxides.

The amount of the at least one amine-initiated polyol in the adhesive composition is, by weight based on the weight of the adhesive composition (i.e., the total weight of the isocyanate component and the polyol component), at least 2 wt %, or at least 10 wt %, or at least 20 wt %. The amount of the at least one amine-initiated polyol in the adhesive composition is, by weight based on the weight of the adhesive composition, not to exceed 100 wt %, or not to exceed 95 wt %, or not to exceed 90 wt %.

In some embodiments, the polyol component comprises a catalyst for increasing the reactivity of the system. Catalysts suitable for sufficiently increasing the reactivity of the adhesive compositions so that they can be used according to the disclosed methods include, but are not limited to, bismuth catalysts, zinc catalysts, zirconium catalysts, tin catalysts, and aluminum catalysts.

In some embodiments, at least one non-amine-initiated polyol may optionally be included in the adhesive composition, e.g., in the polyol component. Examples of the non-amine-initiated polyol include, but are not limited to, polyester polyols, polyether polyols, polycarbonate polyols, polyacrylate polyols, polycaprolactone polyols, polyolefin polyols, natural oil polyols, and combinations of two or more thereof. Preferably the non-amine-initiated polyol has viscosity at 25° C. of from 30 to 40,000 mPa-s, or from 50 to 30,000 mPa-s, or from 70 to 20,000 mPa-s, as measured by the method of ASTM D2196. Preferably the non-amine-initiated polyol has viscosity of 100 to 10,000 mPa-s at 25° C., as measured by the method of ASTM D2196.

The amount of the at least one non-amine-initiated polyol in the adhesive composition is at least 0 wt %, or at least 5 wt %, or at least 10 wt %. The amount of the at least one non-amine-initiated polyol in the adhesive composition is not to exceed 98 wt %, or not to exceed 90 wt %, or not to exceed 80 wt %.

The mix ratio of the isocyanate component to the polyol component, by weight, is controlled by adjusting the coating weight of each component to its respective substrate. In some embodiments, the mix ratio of the isocyanate component to the polyol component in the final adhesive composition can be 100:100, or 100:90, or 100:80. The disclosed adhesive compositions are more forgiving than traditional adhesives and can accommodate some coating weight error (e.g., up to about 10% coating weight error).

In some embodiments, one or more additives can optionally be included in the adhesive composition. Examples of such additives include, but are not limited to, tackifiers, plasticizers, rheology modifiers, adhesion promoters, antioxidants, fillers, colorants, surfactants, catalysts, solvents, and combinations of two or more thereof.

The polyol component can further comprise other constituents commonly known to those of ordinary skill in the art, e.g., additional polyols, catalysts, isocyanates, etc.

Laminate Formation

It is contemplated that the isocyanate component and the polyol component of the solventless adhesive compositions used in the disclosed methods are formulated separately and stored until it is desired to form a laminate structure. Preferably, the isocyanate component and polyol component are in a liquid state at 25° C. Even if the components are solid at 25° C., it is acceptable to heat the components as necessary to put them into a liquid state. As the pot-life of the adhesive composition is decoupled from the curing process, the components can be stored indefinitely.

A laminate formed according to the disclosed methods can be formed by applying the isocyanate and polyol components of an adhesive composition separately to two different substrates, such as two films. As used herein, a "film" is any structure that is 0.5 mm or less in one dimension and is 1 cm or more in both of the other two dimensions. A "polymer film" is a film that is made of a polymer or mixture of polymers. The composition of a polymer film is, typically, 80 percent by weight or more by weight one or more polymers.

Turning now to FIG. 1, a schematic view of an apparatus for carrying out the method is shown, for illustrative purposes. The apparatus includes a first substrate 102 which is unwindable from a first unwinder web 104. The first substrate can be a film, as discussed above. The first substrate 102 passes through an application unit 106 in which a layer of an isocyanate component of an adhesive composition is applied to the first substrate 102. The application unit includes dosing rollers typically operated between 30 and 40° C. The application unit further includes an application roller typically operated between 30 and 60° C. The apparatus further includes a second substrate 108 which is unwindable from a second unwinder web 110. The second substrate 108 can also be a film. The second substrate passes 108 through an application unit 112 in which a layer of a polyol component of the adhesive composition is applied to the second substrate 108. Preferably, the thickness of the first and second layers applied to the first and second substrates 102, 108, respectively, are from 0.5 to 2.5 μm each. By controlling the thickness of the layers applied to each substrate, the ratio of the components can be controlled.

The surfaces of the first and second substrates 102, 108 are then run through a device for applying external pressure to the first and second substrates 102, 108, such as nip roller 114. The nip roller is typically operated between 30 and 50° C. and at a pressure between 2 and 4 bar. Bringing the isocyanate component and polyol component together forms a curable adhesive mixture layer. When the surfaces of the first and second substrates 102, 108 are brought together, the thickness of the curable adhesive mixture layer is 1 to 5 μm. The isocyanate component and polyol component begin mixing and reacting when the first and second substrates 102, 108 are brought together and the components come into contact with each other. This marks the beginning of the curing process.

Further mixing and reacting is accomplished as the first and second substrates 102, 108 are run through various other rollers, e.g., roller 116, and ultimately to a rewind roller 118. The further mixing and reacting occurs as the first and second substrates 102, 108 pass through rollers because the substrates each take longer or shorter paths than the other substrate across each roller. In this way, the two substrates move relative to one another, mixing the components on the respective substrates. Arrangements of rollers in an application apparatus are commonly known in the art. The curable mixture is then cured or allowed to cure.

Suitable substrates in the laminate structure include films such as paper, woven and nonwoven fabric, metal foil, polymers, and metal-coated polymers. Films optionally have a surface on which an image is printed with ink; the ink may be in contact with the adhesive composition.

Figure 2:
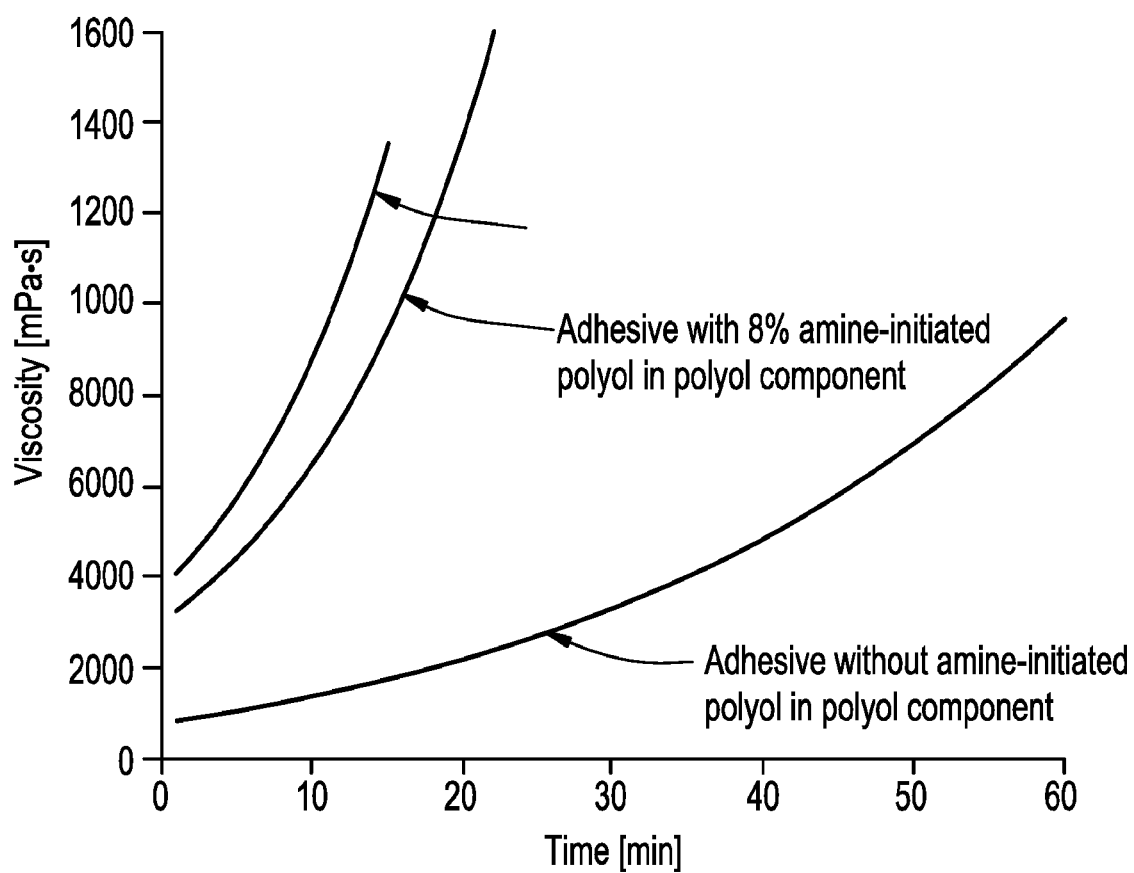
FIG. 2 is a plot illustrating the viscosity of an Illustrative Example and a Comparative Example versus time.

Turning now to FIG. 2, a plot showing the reactivity profiles of adhesive compositions according to the present disclosure, i.e., comprising a disclosed amine-initiated polyol, and that of an adhesive composition without an amine-initiated polyol are shown. In FIG. 2, an adhesive composition comprising 13 percent by weight of an amine-initiated polyol, based on the weight of the polyol component, initially comprises a viscosity at 40° C. of approximately 4,000 mPa-s at the time of lamination. Surprisingly, the viscosity increases rapidly to greater than 10,000 mPa-s in less than fifteen minutes after lamination. An adhesive composition comprising 8 percent by weight of an amine-initiated polyol, based on the weight of the polyol component, initially comprises a viscosity at 40° C. of approximately 3,000 mPa-s at the time of lamination. Surprisingly, the viscosity increases rapidly to greater than 10,000 mPa-s in less than twenty minutes after lamination. Conversely, the adhesive composition without an amine-initiated polyol initially comprises a viscosity at 40° C. of approximately 1,000 mPa-s at the time of lamination. The viscosity does not exceed 10,000 mPa-s until approximately sixty minutes after lamination. This reactivity profile is typical of existing solventless adhesive compositions.

EXAMPLES OF THE DISCLOSURE

The present disclosure will now be explained in further detail by describing examples illustrating the disclosed adhesive compositions and existing adhesive compositions (collectively, "the Examples"). However, the scope of the present disclosure is not, of course, limited to the Examples.

In the Examples, the isocyanate component comprises aromatic isocyanates commonly known to those of ordinary skill in the art, e.g., TDI MDI. The polyol components of the Examples are prepared according to the formulations listed in Table 1, below:

TABLE 1

| | | OH Component Sample Formulations | | | | | | |
|---|---|---|---|---|---|---|---|---|
| Component | Chemical Nature | E1 (wt %) | E2 (wt %) | E3 (wt %) | E4 (wt %) | E5 (wt %) | E6 (wt %) | E7 (wt %) |
| A | Polyol | | 61 | 73 | | 75 | 74 | |
| B | Polyol | 55 | | | 54 | | | 55 |
| C | Polyol | | 15 | | | | | |
| D | Polyol | | 20 | | | | | |
| E | Polyol | | 4 | 2 | | 2 | 2 | |
| F | Polyol | | | | 8 | 5 | | |
| G | Amine-Initiated Polyol | 11 | | 20 | 20 | 10 | 10 | 11 |
| H | Polyester | | | | | | 8 | |
| I | Polyester | | | | | | | 16 |
| J | Polyester | 16 | | | | | | |
| K | Polyester | 8 | | | 8 | | | 8 |
| L | Aromatic Isocyanate | 10 | | 5 | 10 | 8 | 6 | 10 |
| | OH Number | 149 | 226 | 128 | 136 | 128 | 130 | 142 |

Laminate structures comprising the polyol components described in Table 1 are prepared on a Nordmeccanica LABO COMBI™ laminator. The prepared laminate structures are then tested for bond strength and primary aromatic amine decay on the LABO COMBI™ laminator. The bond strength of the laminate structures is tested according to ASTM F904. The primary aromatic amine decay analysis is a test for the determination of primary aromatic amines in aqueous food stimulants (3% acetic acid). The test is based on the official BrF Method No. L 00-00.6 and Commission Regulation (EU) No. 10/2011.

Performance results are shown in Table 2, below. Bond strength is measured according to ASTM F904 at 2 hours, 4 hours, 1 day, and 2 days after lamination. Primary aromatic amine decay is tested according to BrF Method No. L 00-00.6 and Commission Regulation (EU) No. 10/2011 at 24 hours, 2 days, and 3 days after lamination.

TABLE 2

Performance Results on LABO COMBI ™

| OH Component Sample | Laminate Structure | Bond Strength (N/15 mm) | | | | PAA decay (µg/100 mL) | | |
|---|---|---|---|---|---|---|---|---|
| | | 2 hr | 4 hr | 1 day | 2 day | 24 h | 2 d | 3 d |
| E2 | PET-ALU/PE | 0.5 a coex | 2.1 a PE | 4.8 a ALU + WL PE | 4.8 a ALU | 0.6 | <0.2 | — |
| E3 | PET-ALU/PE | 1.6 a coex | 3.5 a PE | 2.5 a PE | 2.1 a PE | 0.4 | 0.3 | — |
| E4 | PET-ALU/PE | 2.4 a PE | 2.5 a PE | 2.1 a PE | 1.9 a PE | 1 | 0.6 | — |
| E5 | PET-ALU/PE | 0.7 a coex | 2.6 a PE | 3.9 a PE | 3.8 a PE | <0.2 | <0.2 | — |
| E6 | PET-ALU/PE | <0.2 a coex | 1.6 a PE | 3.6 a PE | 2.7 a PE | <0.2 | — | — |
| E7 | PET-ALU/PE | 0.7 a coex | 2.9 a PE | 3.0 a PE | 4.1 a PE | 0.24 | 0.34 | — |
| E1 | PET-ALU/PE | 0.9 a coex | 2.3 a PE | 5.2 a PE | 6.0 a coex | 0.24 | <0.2 | — |
| E1 | PET/PE (mix ratio 100/90) | 0.7 a coex | 1.9 a PE | 2.9 t PET | 5.3 t PET | — | 0.23 | <0.2 |
| E1 | PET/PE (mix ratio 100/95) | 0.7 a coex | 1.9 a PE | 2.4 t PET | 4.2 t PET | — | 0.26 | <0.2 |
| E1 | BOPP ink/metPP | 1.4 a BOPP | 1.6 a BOPP | 1.6 a BOPP | 1.7 a BOPP | — | <0.2 | |
| E1 | OPA/PE | 2.2 a coex | 5.0 t PE | 5.7 t + b PE | 6.9 t + b PE | — | 0.5 | 0.5 |
| E1 | PET/PE (mix ratio 100/90) | 0.7 a coex | 1.9 a PE | 2.9 t PET | 5.3 t PET | — | 0.2 | <0.2 |

In Table 2, "a" indicates that the adhesive remains intact, and "t" indicates that one of the laminate structures is torn. Based upon the data in Table 2, inclusion of an amine-initiated polyol increases the reactivity of the adhesive composition. As illustrated in Table 3, the formulations comprising the amine-initiated polyol exhibit faster bond development and faster PAA decay. In particular, full bond development is achieved in two days. Full bond development occurs when all functional groups (e.g., NCO and OH groups) of the at least one isocyanate and polyols have been reacted and integrated into the final polymer chain, i.e., no further crosslinking reaction are ongoing and the final bond performance, thermal and chemical resistance is achieved. However, a bond sufficient to slit the laminate structure is achieved within one hour after lamination using the polyol component comprising the highly-reactive amine-initiated polyol. A laminate structure has a bond sufficient to slit when it has a bond strength of at least 1 N/15 min and a tack-free adhesive.

Laminate structures are also formed on a lamination machine with two coating heads, as envisioned according to this disclosure. The prepared laminate structures are then tested for bond strength and primary aromatic amine decay.

TABLE 3

Performance Results on Two Coating Head Laminator

| OH Component Sample | NCO Component Substrate | OH Component Substrate | Coating Weight/Substrate (g/m²) | Line Speed (m/min) | Bond (N/15 mm) @ 0.5 hr | Bond (N/15 mm) @ 1 hr | Bond (N/15 mm) @ 1.5 hr | Bond (N/15 mm) @ 2 hr |
|---|---|---|---|---|---|---|---|---|
| E2 | PET-ALU | PE | 1.8 | 300 | — | — | — | 0.5 |
| E1 | PET Unprinted | Metallized PP | 1.8 | 300 | 0.13 | 0.47 | 1.1 | 2.0 |
| E1 | Metallized PP | PET Unprinted | 1.8 | 150 | 0.11 | 0.43 | 0.94 | 1.5 |
| E1 | PET-ALU | PE | 1.75 | 300 | 0.15 | 0.37 | 1.4 | 2.1 |
| E1 | PE | ALU-PET | 1.75 | 300 | 0.13 | 0.32 | 1.1 | 2.1 |
| E1 | BOPP Printed | PE | 2 | 300 | 0.11 | 0.27 | 0.93 | 1.5 |
| E1 | PE | BOPP Printed | 1.85 | 150 | 0.11 | 0.21 | 0.61 | 1.0 |

As indicated in Table 3, adhesive compositions including the disclosed amine-initiated polyol surprisingly all achieved bond strengths in excess of 1.0 N/15 min within two hours of laminating. Many of the Examples even exhibited bond strengths in excess of 2.0 N/15 min within two hours of laminating.

The invention claimed is:

1. A method for forming a laminate structure, comprising:
   uniformly applying an isocyanate component to a first substrate, the isocyanate component comprising at least one isocyanate;
   uniformly applying a polyol component to a second substrate, the polyol component comprising at least one amine-initiated polyol having the structure I:

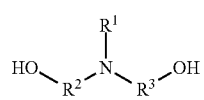

wherein $R^1$, $R^2$, and $R^3$ are independently a linear or branched saturated hydrocarbon group;
   bringing the first and second substrates together, thereby mixing and reacting the isocyanate component and the polyol component to form an adhesive between the first and second substrates; and
   curing the adhesive to bond the first and second substrates,
   wherein the adhesive comprises a viscosity greater than 10,000 mPa-s (at 40° C.) within 10 minutes after bringing the first and second substrates together.

2. The method for forming a laminate structure of claim 1, wherein the isocyanate component and polyol component are applied to the first substrate and second substrate, respectively, in a ratio of isocyanate component to polyol component from 0.5:1 to 1.5:1.

3. The method for forming a laminate structure of claim 1, wherein the isocyanate component and polyol component are each applied to the first substrate and second substrate, respectively, at a coating weight of from 0.25 to 1.5 g/m².

4. The method for forming a laminate structure of claim 1, wherein the adhesive composition comprises a bond strength of at least 0.5 N/15 mm within 60 minutes after bringing the first substrate and second substrate together.

5. The method for forming a laminate structure of claim 1, wherein bringing the first substrate and second substrate together comprises passing the first and second substrates through a nip roller.

6. The method for forming a laminate structure of claim 1, further comprising mixing the isocyanate component and polyol component after bringing the first substrate and second substrate together by passing the first substrate and second substrate through one or more rollers.

7. The method for forming a laminate structure of claim 1, wherein the first substrate and second substrate are each selected from group consisting of paper, woven and nonwoven fabrics, metal foils, polymer films, metal-coated polymer films, printed films, and combinations of two or more thereof.

8. The method for forming a laminate structure of claim 1, further comprising heating the isocyanate component and polyol component to between from 30 to 80° C. prior to application to the first substrate and second substrate, respectively.

9. The method for forming a laminate structure of claim 1, wherein the isocyanate component and polyol component each comprises a viscosity at 40° C. of from 500 to 10,000 mPa-s.

10. A method for forming a laminate structure, comprising:
    uniformly applying an isocyanate component to a first substrate, the isocyanate component comprising at least one isocyanate;
    uniformly applying a polyol component to a second substrate, the polyol component comprising at least one amine-initiated polyol comprising primary hydroxyl groups and a backbone incorporating tertiary amines, wherein the amine-initiated polyol has the structure I:

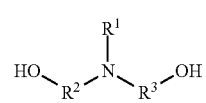

wherein $R^1$, $R^2$, and $R^3$ are independently a linear or branched saturated hydrocarbon group;
    bringing the first and second substrates together, thereby mixing and reacting the isocyanate component and the polyol component to form an adhesive between the first and second substrates; and
    curing the adhesive to bond the first and second substrates.

11. The method for forming a laminate structure of claim 10, wherein the amine-initiated polyol comprises a hydroxyl number of 37.

12. The method for forming a laminate structure of claim 10, wherein the amine-initiated polyol comprises a viscosity at 25° C. of about 1,200 mPa-s.

13. The method for forming a laminate structure of claim 10, wherein the isocyanate component and polyol component are applied to the first substrate and second substrate, respectively, in a ratio of isocyanate component to polyol component from 0.5:1 to 1.5:1.

14. A method for forming a laminate structure, comprising:
    uniformly applying an isocyanate component to a first substrate, the isocyanate component comprising at least one isocyanate;
    uniformly applying a polyol component to a second substrate, the polyol component comprising at least one amine-initiated polyol having the structure I:

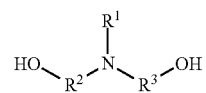

wherein $R^1$, $R^2$, and $R^3$ are independently a linear or branched saturated hydrocarbon group, the polyol component comprising at least one catalyst selected from the group consisting of bismuth catalysts, zinc catalysts, zirconium catalysts, tin catalysts, and aluminum catalysts;

bringing the first and second substrates together, thereby mixing and reacting the isocyanate component and the polyol component to form an adhesive between the first and second substrates; and curing the adhesive to bond the first and second substrates.

* * * * *